United States Patent [19]
von Belvard

[11] 3,841,742
[45] Oct. 15, 1974

[54] METHOD FOR PREPARING A LIMITED FILM LENGTH

[75] Inventor: Peter Revy von Belvard, Vienna, Austria

[73] Assignees: Karl Vockenhuber; Raimund Hauser, both of Vienna, Austria

[22] Filed: Oct. 26, 1972

[21] Appl. No.: 301,078

[30] Foreign Application Priority Data
Oct. 28, 1971 Austria .............................. 9327/71

[52] U.S. Cl. ................................................ 352/91
[51] Int. Cl. ........................................... G03b 21/36
[58] Field of Search ............................. 352/91, 217

[56] References Cited
UNITED STATES PATENTS
2,117,694  5/1938  Becker .............................. 352/217
3,514,197  5/1970  Sho .................................. 352/91 S
3,582,198  6/1971  Reinsch ............................... 352/91

Primary Examiner—Monroe H. Hayes

[57] ABSTRACT

An apparatus and method to carry out multiple exposures of a motion picture film strip enclosed in a cartridge having a take-up device to be driven in a normal take-up direction, the take-up device having a rewind stop, which comprises exposing a first scene to be photographed on a limited portion of the film strip while moving the film strip in a forward direction, moving the film backward the limited portion, and exposing a second scene to be photographed while moving the film forward, further comprising applying torque to the take-up device in rewind direction by a driving device during exposure of the first scene; and also during the step of moving backwards thereby providing a relative movement between the take-up device with its rewind stop and the driving device.

6 Claims, 10 Drawing Figures

FIG.5
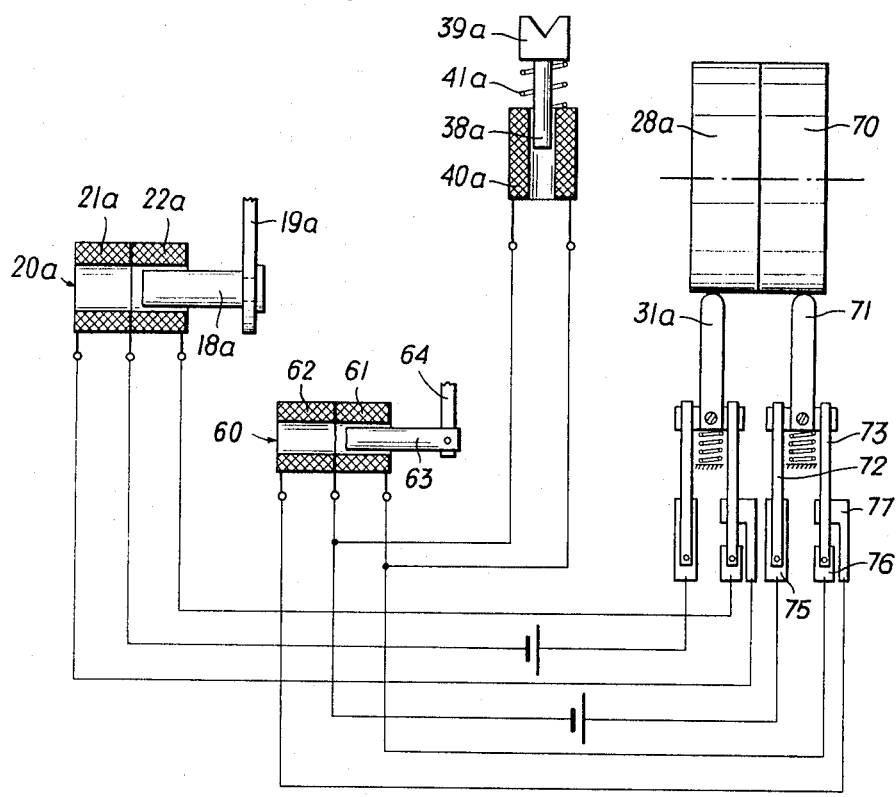
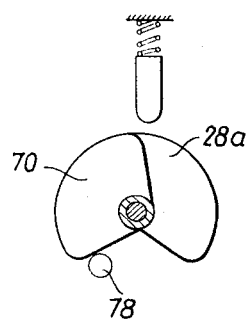
FIG.6a
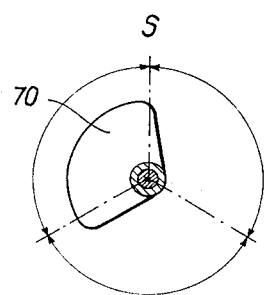
FIG.6b
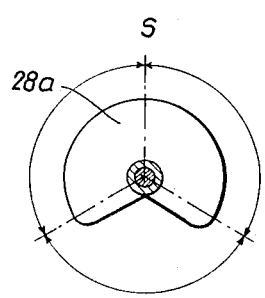
FIG.6c

METHOD FOR PREPARING A LIMITED FILM LENGTH

The invention relates to a method for preparing, when making fading shots, a limited film length in a camera, the film take-up reel of which is being driven by the camera motor and being provided with rewind locking means, whereby during a forward run the film portion to be prepared is exposed for the first time, and subsequently this film portion is transported back and finally during the second exposure of the film portion, it is transported in the forward direction by an intermittent drive arranged in the camera and by a drive for the take-up reel.

For making fading shots in such cameras it has been suggested to stop the drive for the take-up reel, locked against rewind, as well at the first exposure of a film portion to be prepared, and upon following transport of the portion back to the supply reel. In this manner the film is first transported during the fading out of the exposure aperture into the take-up chamber, where it loosely winds round the coiling pin. The film portion is then transported back to the supply reel, and is then exposed upon a subsequent second forward run with an opening diaphragm, and is then coiled up on the now driven take-up reel. It has been, however, proved that by stopping the coiling gear, the driving motor is subject to various sudden stresses of relatively long duration. From this result variations in the film transport velocity during fading out and rewinding, which disturb the projection of the exposed film.

Another known solution avoids this disadvantage. Here the drive for the take-up reel may be operated during fading out with a lower velocity with respect to the claw transport. In this way the load of the driving motor is kept rather constant. As the take-up reel is now slowly, but still driven in winding direction, the beginning of the faded out film portion to be prepared coils up on the coiling pin, which is then retained upon the following rewinding of the loose film portion by the now locked take-up reel Thus, fading in for fading effects may only be started from a point, when the exposure of the film portion has already decreased.

In order to avoid this disadvantage, however, in order to keep the load of the motor drive substantially constant, it is suggested according to an inventive method of the type set forth at the introduction, that the drive for the take-up reel moves during forward run for preparing the limited film length, in opposite direction to the winding direction, whereas the film is intermittently driven in the forward direction, as it is known per se, and that also during the following rewinding of the prepared film portion, the drive for the take-up reel moves in a direction opposite to the winding direction, whereby at the same time the film is transported in the rewind direction, as it is known per se.

An advantageous construction of an arrangement for the inventive method in a camera with a mode control switch and with at least one means for reversal of the torque is with a reversal means of the torque, for instance, when a turnover gear is switched in by the mode control switch in "fading" position at least during the forward running at the first exposure of the film portion to be prepared.

By switching in of the reversal means of the torque, the problem to keep the load of the driving motor constant is solved in a most easy way. As the take-up reel is locked in the rewind direction, the moment transmitted, for instance, by a turnovergear, could be taken up by a friction clutch.

The fading phase may be subdivided in three single phases: fading out during gaining of a film portion, which is not coiled upon the take-up reel; rewind of the loose film portion; fading in at normal film transport velocity. In an inventive camera with a driving motor reversing the direction of rotation, it is necessary to conform the direction of rotation of the motor with the film transport direction during fading. According to the invention it is suggested that during the forward running during the first exposure of the film portion to be prepared, the camera motor is switched over in the direction of rotation and that the reversal means of the torque is coupled with the intermittent drive, whereas during rewinding of the prepared film portion with the camera motor furthermore the movement of rotation is reversed. The torque reversal means is switched off and upon the second exposure of the film portion, the camera motor is switched in in forward direction and the torque reversal means is switched off.

If the camera has a driving motor, which is not reversible in the direction of rotation, it is further suggested according to an advantageous embodiment of the invention, that during the forward running during the first exposure of the film portion to be prepared and during rewinding of the prepared film portion, the torque reversal means is coupled with the drive of the take-up reel, whereas during rewinding of the prepared film portion, the torque reversal means is coupled with the intermittent drive. During the second exposure of the film portion however the reversal means of the torque is switched off.

Further details and features of the invention will become apparent from the specification and the embodiments schematically illustrated in the drawings.

Figure 1:
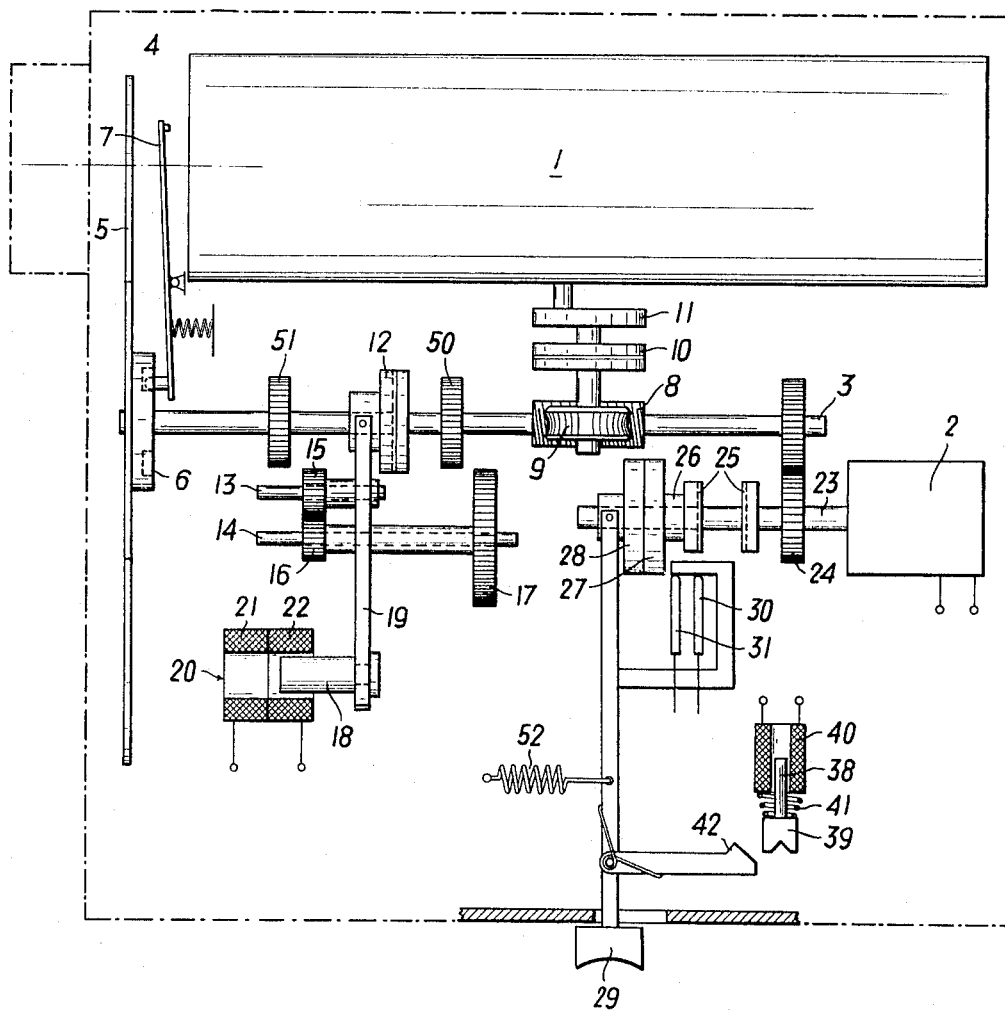
FIG. 1 shows a schematic design of an inventive arrangement in a camera, the driving motor of which is reversible in the direction of rotation.
Figure 3A:
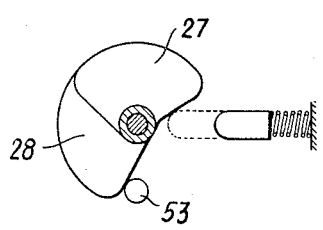
Figure 3B:
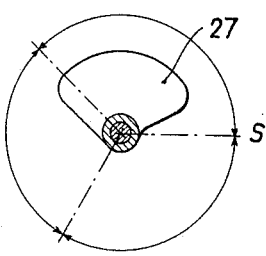
Figure 3C:
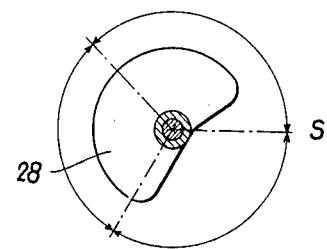

In FIGS. 3a to 3c the development of the switching curves and their arrangement in the camera shown in FIG. 1 are schematically illustrated.

Figure 4:
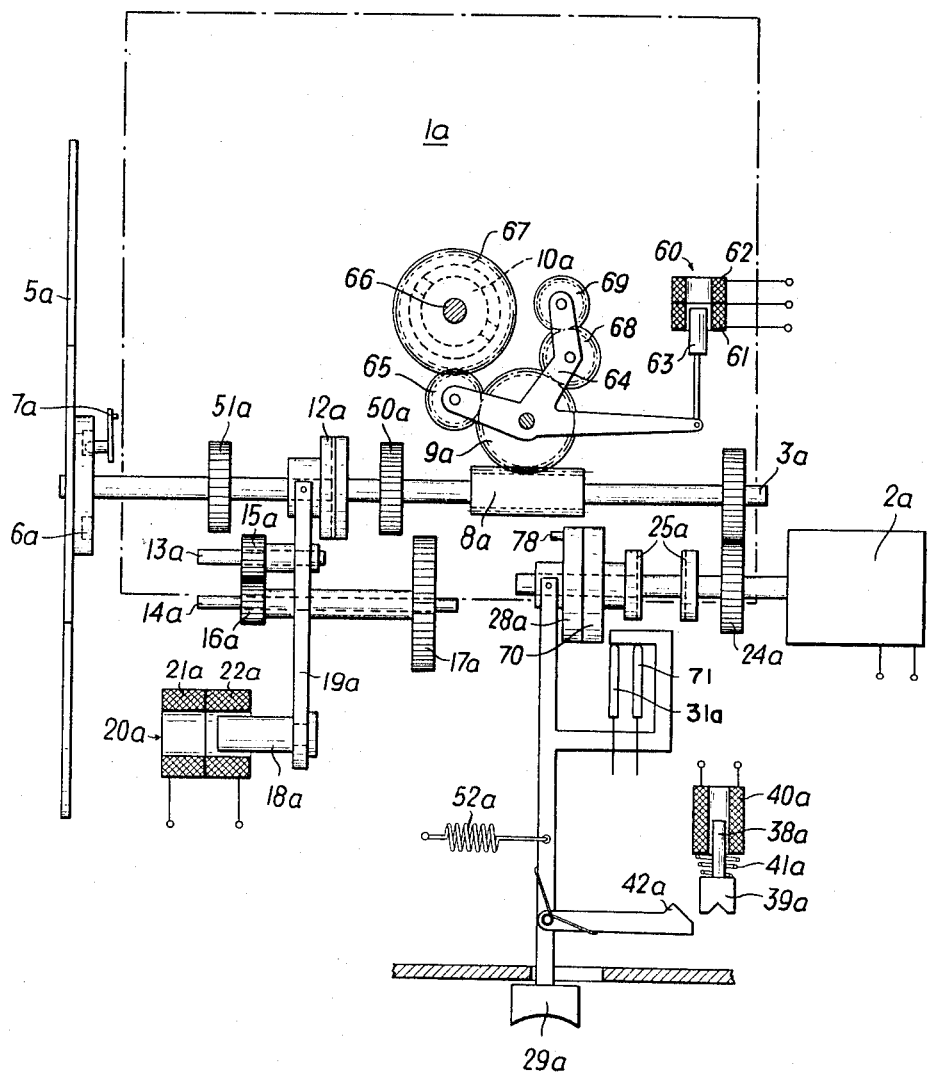

An inventive embodiment of a camera, in which the direction of rotation of the driving motor remains constant, is displayed in FIG. 4. FIG. 5 shows the switching arrangement required for the control of this camera. In FIGS. 6a to 6c the development and arrangement of the switching curves in the camera according to FIG. 4 are illustrated.

A camera, not fully shown, contains a cartridge 1 with a film to be exposed. A main shaft 3 driven by a motor 2 reversing the direction of rotation bears a rotating diaphragm 5 provided with a control cam 6 for a film transport claw 7 on the end adjacent a film gate 4 of the cartridge 1. Further a worm 8 is fastened on the shaft 3, which transmits the torque of the motor by means of a worm wheel 9 and a friction clutch 10 to a pinion 11 for the take-up reel arranged in the cartridge 1 and locked against rewind.

Between the connection of the worm 8 and the rotating diaphragm 5, a clutch 12 is arranged on the main shaft 3, a portion of which is adjacent the rotating diaphragm 5 and sprockets 15, 16 and 17, respectively, arranged on countershafts 13, 14 is shiftable in the direction of the main shaft axis by means of a lever 19 bearing an anchor 18. The anchor 18 is movable into an electromagnet 20 bearing two spools 21, 22.

In addition to a sprocket 24 transmitting the torque to the main shaft 3, there is provided a further clutch 25 on the motor shaft 23, whereby the part 26 of the clutch 25 which is shiftable on the shaft 23, bears switching curves 27, 28 and is controlled by a fading switch 29.

The switching curve 27 controls the direction of rotation of the driving motor 2, and the switching curve 28 controls the circuit for the electromagnet 20 for reversing upon fading the direction of rotation of the claw gear.

In the following the mode of operation of the camera at fading shots is set forth in detail. Starting the fading shots, the control lever 29 is pressed to its right final position, related to FIG. 1. Simultaneously the switching curves 27, 28 are shifted together with the clutch portion 26 along the motor shaft 23 and are coupled to the motor drive. At the same time with the displacement of the control lever 29, elastic keys 30, 31 are released in a transverse dirction to the motor shaft 23, whereby the key 30 abuts the switching curve 27 and the key 31 abuts the switching curve 28. The curve 27 controlling the direction of the driving motor 2 has a cam dimple in the start position S (see FIG. 3b), and thereby the key 30 is shifted in transverse direction to the shaft 23, whereby the sliders 32 and 33 connected with the key 30 are moved therealong. The slider 32 at the rotating direction of the driving motor during forward running lies on a contact part 36, and the slider 33 lies on a contact part 37. Upon displacement of the key 30 in the direction of the motor shaft 23, the motor direction is reversed in that the slider 32 now lies on the part 37, and the slider 33 now lies on the part 36 and thus the motor 2 is reversed.

In order to lock the control lever 29 during the duration of fading, a groove member 39 is provided which is connected with an anchor 38 for the control lever 29. The anchor 38 enters into a spool 40, controlled by the sliders 32, 33 and slide contacts 34, 35 respectively, is energized. As already mentioned, the key 30 has been pressed, upon switching in of the fading arrangement, to the control curve 27, the latter having a cam dimple in the start position S. The sliders 32, 33 move out of the range of the contacts 34 and 35, the spool 40 is de-energized and the grooved member 39 locks, by means of the action of a spring 41, a pawl 42, the latter being connected to the control lever 29.

Figure 2:
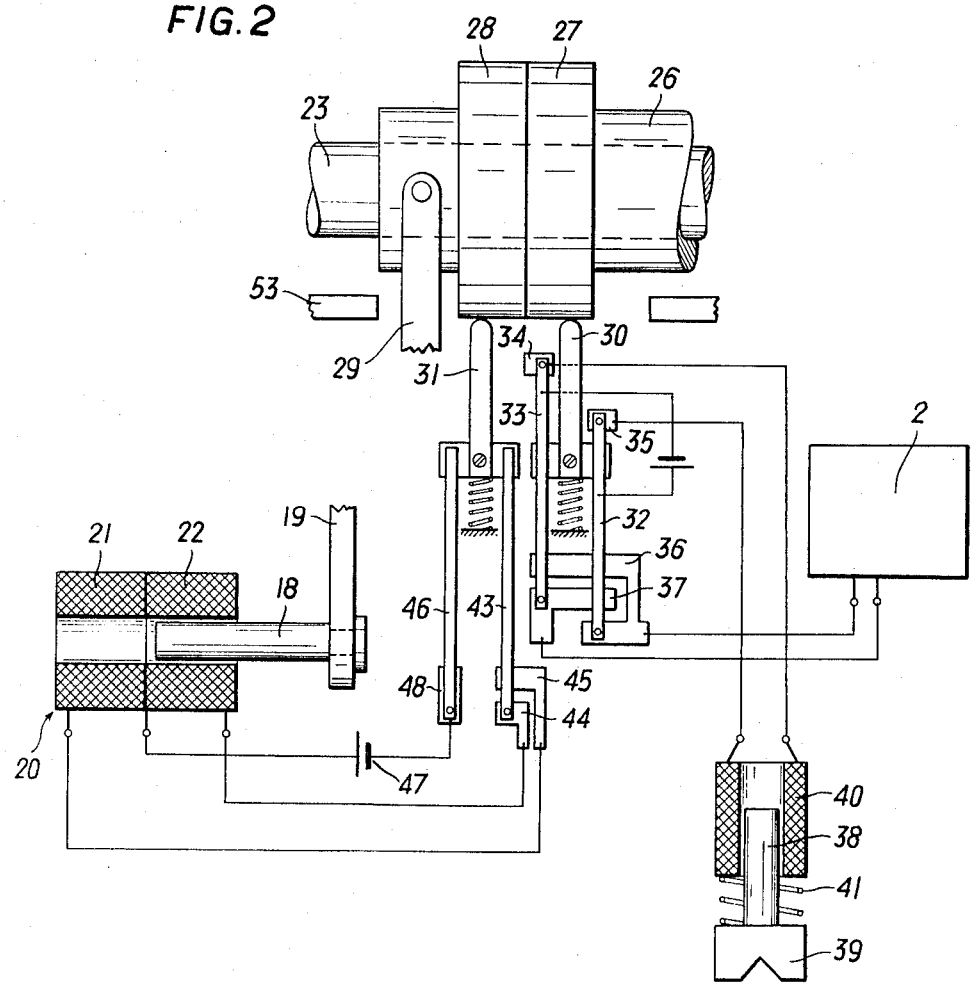
FIG. 2 shows the mode of operation of the control of the camera gear of FIG. 1.

Since, as already mentioned, the direction of rotation of the motor is reversed during the phase of fading out, it is also necessary to reverse the claw gear in its direction of rotation. The switching curve 28 is provided for this purpose, which switching curve 28 controls the voltage of the spool 20 for switching in the reversing gear. This control curve 28 is rigidly connected with the control curve 27, and its relative angular position is schematically illustrated in FIG. 3a. The key 31, as well as the key 30, encounters a cam dimple in the start position. In this manner the voltage from the spool 22 induced in the rest position of the key 31 is transmitted to the spool 21. According to FIG. 2 this takes place in that a slider 43 connected with the key 31 changes, upon the shifting movement of the key 31, from a contact part 44 assigned to the spool 22 to a contact part 45 assigned to the spool 21. A second slider 46 connected with the key 31 remains, during the shifting of the key 31, on the contact part 48, which latter part is connected with a voltage source 47 and with a winding common to both spools 21, 22.

After the anchor 18 has been attracted by the spool 21, the sprockets 15, 16 and 17 controlled by the anchor 18 by means of the lever 19 mesh wth the sprockets 50 and 51 respectively, arranged on the main shaft 3, and simultaneously the clutch is released. The torque is reversed.

The worm gear 8, 9 controlled by the main shaft 3 transmits the torque, which is opposite to the winding direction, to the pinion or drive wheel 11, whereby the lock on the cartridge 1 becomes effective. The clutch 10 slips. In order to accommodate approximately the load of the motor to normal operation, the friction force to be overcome in the clutch 10 is only slightly larger than the torque to be applied to the drive of the take-up reel in forward run.

In order to rewind the so gained loosely coiled film portion, the switching curve 28 has a cam lobe in the second third of its periphery (see FIG. 3c), whereby the spool 22 is energized by means of the key 31, the sliders 43, 46 and the contact parts 44, 48, so that the reversing gear is again switched off. The claw 7 transports the film back to the supply reel. The reversed direction of rotation of the motor 2 is furthermore maintained due to the switching position resulting from the cam dimple of the switching curve 27. After rewinding of the film portion, the cam lobe of the switching curve 27 becomes effective (see FIG. 3b), the key 30 reverses the direction of rotation of the motor and the drive moves in a forward run. THe torque is then transmitted directly to the take-up reel.

Upon resetting the key 30 to its initial position, the sliders 34, 35 are simultaneously energized, the spool 40 is stimulated and the groove 39 which is designed as an anchor is attracted. The control lever 29 is disengaged and with released clutch 25, it is brought back to its initial position by the action of a spring 52; likewise the switching curves 27, 28 connected with the control lever 29 are brought back to their initial position.

In order to bring the two switching curves 27, 28 to their starting position for the next fading shots, there is provided a fixed stop 53, which upon resetting to the rest position, turns on the two curves by the required amount.

If the camera is equipped with a driving motor, which is not reversible in the direction of rotation, it could be designed as shown, for instance, in FIG. 4. It only differs from the design of the camera set forth above, by a required second reversing gear assigned to the coiling gear. This reversing gear could be controlled by an electromagnet 60 with spools 61, 62. An anchor 63 deviates, upon plunging from the spool 61 into the spool 62, a lever 64, which is tiltable about the axis of the worm wheel 9a. A sprocket 65 which is supported by the lever 64 and which meshes with the worm wheel 9a is removed by a sprocket 67 fixed on a driving shaft 66 for the take-up reel. Simultaneously however, together with the sprocket 67, a further sprocket 69 comes into engagement, which is driven over a sprocket 68 by the worm wheel 9a and is supported by the lever 64, so that the direction of rotation is now reversed.

In FIG. 5 the mode of operation of the camera at the fading in procedure is illustrated. Instead of the switching curve 27 for the direction of rotation of the drive motor, a switching curve 70 is provided for the control of the reversing gear for the take-up reel set forth above. The control of the electromagnets 20a and 60 corresponds to the control of the electromagnet 20 of FIG. 1 and need not be explained further. Only the design and the assignment of the two switching curves 28a and 70 differ from the design and the assignment of the switching curves 27, 28 of FIG. 1, whereby again a cam lobe characterizes the actuation of an arrangement for the reversal of the torque.

The switching in of the switching curves 28a, 70 into the range of the keys 31a, 71 in the camera according to FIG. 5 is like that illustrated in FIG. 1. In the start position S of the switching curve 28a of the claw gear a cam lobe stands opposite the key 31a, as the motor 2a remains constant in the direction of rotation (corresponding to the forward direction), so that the drive for the claw 7a and for the rotating diaphragm 5iis effected directly over the closed clutch 12a. The control curve 70 shows a cam dimple in the start position, a key 71 assigned to the curve 70 switches the voltage from the spool 61 over to the spool 62 by means of sliders 72, 73 and contact parts 75, 76, 77. The sprocket 69 transmits a torque opposite to the winding direction to the take-up reel. The torque is taken up by the friction clutch 10a.

After fading out, the gained film portion is rewound on the supply reel. Therefor the switching curve 28a for the control of the claw gear shows a cam dimple, by means of which the key 31a causes the anchor 18a to plunge into the spool 21a and therewith the switching in of the reversing gear. The reversing gear for the take-up reel remains further in action, as the switching curve 70 opposes further on a cam dimple to the key 71 (see FIG. 6b).

Finally the fading in procedure takes place, whereby both of the switching curves are provided with a cam lobe (see FIGS. 6b, 6c), so that both of the reversing gears are switched off and the drive equals the normal operation of the camera. The reset of the fading switch takes place in the same way, as set forth in FIG. 1, whereby the switching cams are brought into start position by a stop 78.

Finally it may be mentioned that it would be possible to couple the drive for the switching curves indirectly with the motor, for instance to control it by means of a continuously variable drive. That way the fading in scene could theoretically last optionally long, but in practice this is not possible. Due to the small space in the winding chamber of the cartridge, the length of the film portion to be wound loosely is limited.

While I have disclosed several embodiments of the present invention, it is to be understood that these embodiments are given by example only and not in a limiting sense.

I claim:

1. A method to carry out multiple exposures of a motion picture film strip enclosed in a cartridge having take-up means to be driven in a normal take-up direction, said take-up means having a rewind stop, including the steps of:
    a. exposing a first scene to be photographed on a limited portion of said film strip while moving said film strip in forward direction;
    b. moving the film backward said limited portion, and
    c. exposing a second scene to be photographed while moving the film forward;
the method comprising further:
    applying torque to said take-up means in rewind direction by drive means during exposure of the first scene and also during the step of moving the film backwards, thereby providing a relative movement between the take-up means with its rewind stop and said drive means.

2. In a motion picture camera for carrying out multiple exposures, at least of a first and a second scene, on a limited portion of a film,
    means to receive a cartridge containing said film, said cartridge having take-up means provided with a rewind stop; gate means for the exposure of said film;
    a film moving mechanism to drive said film through said gate means; torque imparting means operatively connectable to said take-up means for driving the same and for imparting torque in opposite directions, said torque imparting means including yielding means for a relative movement of said take-up means with respect to said torque imparting means;
    multiple exposure control means having an operative and an inoperative position; and
    torque reversing means connected between said torque imparting means, and said film moving mechanism and controlled by said control mechanism for reversing the direction of torque applied to said film moving mechanism compared to the direction of torque applied to said take-up mechanism at least during exposure of said first scene.

3. In a motion picture camera for carrying out multiple exposures at least of a first and a second scene on a limited portion of a film,
    means to receive a cartridge containing said film, said cartridge having take-up means provided with a rewind stop;
    gate means for the exposure of said film;
    a film moving mechanism to drive said film through said gate means, alternately in forward and backward direction;
    an electric torque motor running alternately in forward and backward direction and driving said mechanism;
    polarity inverting means connected to said motor to invert its running direction;
    torque imparting means also driven by said motor to drive said take-up means and imparting torque in opposite directions, said torque imparting means permitting a relative movement of said take-up means;
    torque inverting means to be connected to said film moving mechanism;
    polarity control means controlling said polarity inverting means to provide a backward running motor during exposure of said first scene and during the following backward drive of said film;
    torque control means controlling said torque inverting means, having an operative and an inoperative position, and being arranged to maintain a forward drive of said film in operative position and with backward running motor during exposure of said first scene.

4. A camera as claimed in claim 3, for carrying out fading operations, further comprising:

fading means to fade out said first scene and to fade in said second scene after said backward drive of said film;

fading control means for said fading means;

said polarity control means being arranged to provide a forward running motor during exposure of said second scene, and said torque control means being in inoperative position during exposure of said second scene.

5. In a motion picture camera for carrying out multiple exposures at least of a first and a second scene on a limited portion of a film, means to receive a cartridge containing said film, said cartridge having take-up means provided with a rewind stop;

gate means for the exposure of said film;

a film moving mechanism to drive said film through said gate means alternately in forward and backward direction;

an electric torque motor running only in forward direction and driving said mechanism;

torque imparting means also driven by said motor to drive said take-up means and imparting torque in opposite directions, said torque imparting means permitting a relative movement of said take-up means;

torque inverting means having an operative and an inoperative position;

torque control means controlling said torque inverting means to connect at least a first part thereof to said torque imparting means during exposure of said first scene and during the following backward drive of said film for imparting torque against the action of said rewind stop, and to connect at least a second part thereof to said mechanism for effecting said backward drive of said film.

6. A camera as claimed in claim 5 for carrying out fading operations, further comprising:

fading means to fade out said first scene and to fade in said second scene after backward drive of said film;

fading control means for said fading means; with the exposure of said second scene said torque inverting means being in operative position.

* * * * *